United States Patent [19]

Lange

[11] Patent Number: 4,575,632

[45] Date of Patent: Mar. 11, 1986

[54] INFRARED VIEWING APPARATUS

[75] Inventor: Gerhard Lange, Bremen, Fed. Rep. of Germany

[73] Assignee: U.S. Philips Corporation, New York, N.Y.

[21] Appl. No.: 676,592

[22] Filed: Nov. 30, 1984

Related U.S. Application Data

[63] Continuation of Ser. No. 401,040, Jul. 22, 1982.

[30] Foreign Application Priority Data

Aug. 26, 1981 [DE] Fed. Rep. of Germany ....... 3133641

[51] Int. Cl.⁴ .......................... H01J 31/50; H04N 7/18
[52] U.S. Cl. ..................................... 250/334; 250/332; 358/113; 358/208
[58] Field of Search ............... 250/332, 347, 340, 330, 250/349; 358/208, 206, 113

[56] References Cited

U.S. PATENT DOCUMENTS

| | | | |
|---|---|---|---|
| 3,781,559 | 12/1973 | Cooper et al. | 250/334 |
| 3,804,976 | 4/1974 | Gard | 358/206 |
| 3,849,651 | 11/1974 | Ennulat | 250/349 |
| 3,886,359 | 5/1975 | Cheek, Jr. et al. | 250/334 |
| 3,973,124 | 8/1976 | Astheimer | 250/334 |
| 4,152,588 | 5/1979 | Klatt et al. | 250/347 |
| 4,340,888 | 7/1982 | Seroskie | 358/208 |
| 4,362,938 | 12/1982 | Bosserman | 250/334 |

Primary Examiner—Carolyn E. Fields
Attorney, Agent, or Firm—Robert T. Mayer; Algy Tamoshunas

[57] ABSTRACT

An infrared viewing apparatus is described which comprises an infrared objective, a pivotal mirror, a linear infrared detection array, an amplifier arrangement connected to this array, and a display array which is driven by the amplifier arrangement and is imaged onto a plane of observation via the back of the pivotal mirror. By arranging a beam splitter in the radiation path between the display array and the pivotal mirror, which beam splitter transmits a part of the visible radiation to a line sensor, and by controlling the read-out of this sensor by synchronizing device which detects the movement of the pivotal mirror, an electric signal for remote display purposes can be obtained.

6 Claims, 3 Drawing Figures

INFRARED VIEWING APPARATUS

This is a continuation, of application Ser. No. 401,040 filed July 22, 1982.

The invention relates to an infrared viewing apparatus which comprises an infrared objective for imaging via a pivotal mirror which periodically pivots to and fro about an axis, a thermal-image scene onto an infrared detection array which scans the image in accordance with a line, the direction of the line extending parallel to the pivotal axis of the mirror, an amplifier arrangement whose input is connected to the output of the detection array and whose output is connected to a linear display array, and an optical system for imaging the display array in a plane of observation, preferably via the back of the pivotal mirror.

Such a viewing apparatus is known by the name of "Common Module" and is, for example, described in the magazine "Wehrtechnik" of October 1980, pages 21 to 23. By means of such a viewing apparatus it is possible to convert a thermal-image scene into a visible image with a comparatively high resolution, the infrared detection array to be cooled being of a comparatively simple construction. The visible image is generated at the same location as that of the infrared optical system and the infrared detection array.

However, in many cases it is desired to transmit such a visible image of a thermal-image scene over long distances. This is may be done by driving a picture tube with the output signals of the amplifier arrangement. However, this requires a periodically recurrent serial scanning at a very high rate. Substantial problems as regards cross-talk may also occur, so that this solution is technologically hardly feasible. Arranging a television camera before the viewing opening of the device for visual observation, apart from the costs of such a camera, leads to a mechanically unstable construction.

It is an object of the invention to provide an infrared viewing apparatus which, without essentially altering the apparatus, can supply an electric signal from which an image, as it appears to the observer of the plane of observation, can be produced on the picture screen of a picture tube which is remote from the viewing device.

According to the invention the apparatus is characterized in that a beam splitter is arranged in the radiation path between the display array and the pivotal mirror. The beam splitter transmits a portion of the light rays from the display array to a line sensor, which sensor scans the image serially and generates an analog electric line signal. The apparatus also includes a synchronizing device which detects the movement of the pivotal mirror, for controlling the scanning sequence of the line sensor. The line sensor with the associated electronics and the beam splitter may form a small compact unit. It suffices to arrange a beam splitter in the radiation path of the apparatus, no further constructional changes being necessary. An image whose geometry corresponds to that of the directly viewed image is obtained in that the scanning of the line sensor is synchronized with the movement of the pivotal mirror.

An embodiment of the invention is characterized in that the line sensor comprises a charge-coupled semiconductor device. This semi-conductor device is suitably a so-called $p^2$CCD-element, as for example described in the magazine "Electronic components and applications", Vol. 1, No. 3, May 1979. Such an element provides a particularly fast, low-loss scanning and its construction is very compact.

A further embodiment is characterized in that the synchronizing device comprises a further line sensor which is illuminated substantially pointwise by a continuously radiating source via the pivotal mirror. In this way the further line sensor continuously scans the position of the pivotal mirror.

An embodiment of the invention will now be described in more detail, by way of example, with reference of the drawings, wherein.

Figure 1:
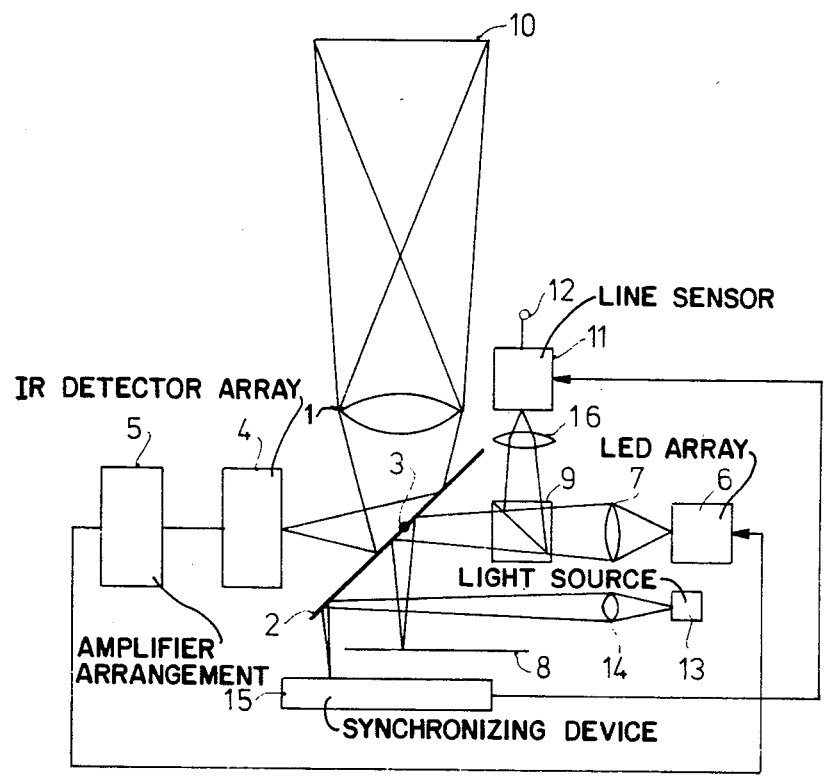
FIG. 1 shows the apparatus of the invention.

The apparatus of the invention shown in FIG. 1 includes an infrared objective, 1 which is represented in simplified form, and which images the thermal-image scene 10 onto the detection array 4 via the pivotal mirror 2. The pivotal mirror 2 is tilted to and fro in a rapid sequence about an axis 3 perpendicular to the plane of the drawing by drive means, not shown. As a result of this, the image of the thermal scene 10 is moved to and fro continuously relative to the detection array 4.

This array comprises a plurality of separate infrared detectors, which are arranged perpendicularly to the plane of the drawing of FIG. 1. As a result of the to-and-fro movement of the imaged thermal scene, this array of detectors scans the thermal-image scene line by line.

Figure 2:
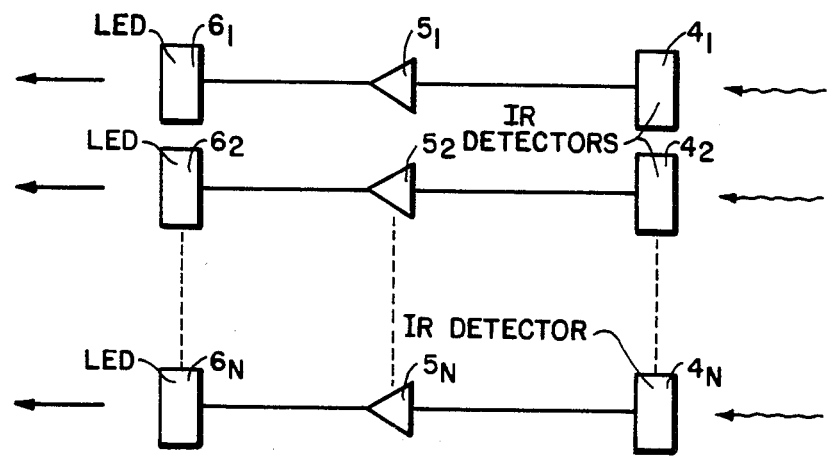
FIG. 2 shows the detection and display arrays of FIG. 1.

As shown in FIG. 2, the infrared detectors $4_1$, $4_1$, $4_2$, ... $4_n$ of array 4 are connected to an amplifier arrangement 5, which comprises a separate amplifier $5_1$, $5_2$, ... $5_n$ for each infrared detector. The outputs of the amplifiers are connected to an array 6 of sources $6_1$, $6_2$, ... $6_n$ emitting visible light, for example diodes. These diodes are arranged as a linear array which extends perpendicularly to the plane of the drawing of FIG. 1 in the same way as the individual infrared detectors. Referring back to FIG. 1, the array of light-emitting diodes is imaged in a plane of observation 8 via an optical system 7 and the reflecting back of the pivotal mirror 2. As a result of this, different lines are projected consecutively in the plane of observation 8 at different locations corresponding to the associated scan lines of the thermal-image scene 10, so that a visible image of the thermal scene 10 is formed in the plane of observation 8.

In the radiation path between the array 6 and the pivotal mirror 2, in the present example between the optical system 7 and the pivotal mirror 2, there is arranged a beam splitter 9, which only transmits a part of the radiation produced by the array 6 to the pivotal mirror and hence to the plane of observation 8 and which reflects a part of this radiation. The reflected radiation traverses an additional objective 16 and is incident on a line sensor 11, where an image of the array 6 of radiation sources is formed.

The line sensor comprises a charge-coupled semiconductor device, suitably of the P$^2$CCD type, which converts the brightness of the individual points of a line of light into corresponding charges and transfers these to an output 12, where these charges appear as voltage signals. Since the array 6 displays the consecutive lines of the thermal-image scene 10 as time-sequential lines of light, a quasi-analog electric signal appears on the output 12, which represents the radiation intensity of the thermal-image scene 10 line by line and which consequently corresponds to the output signal of, for example, a television camera. The output signal on the output 12 can be displayed on the picture screen of a picture tube.

Figure 3:
FIG. 3 shows the synchronization device of FIG. 1.

The line-sequential read-out of the line sensor 11 is controlled in synchronism with the pivotal mirror by a synchronizing device 15 shown in FIG. 3. Via an imaging system 14 and the back of the pivotal mirror 2 this device receives radiation emitted by a continuously radiating source 13, which is suitably substantially point-shaped. The location on the synchronizing device 15 where the light source 13 is imaged is representative of the position of the pivotal mirror 2.

If the synchronizing circuit 15 also comprises a line sensor in the form of a charge-coupled semi-conductor device, it may be read out directly and rapidly in consecutive time intervals. In each of the time intervals an electric signal appears on the output of the semiconductor device, which signal appears at instants after the beginning which correspond to the location of the image of the light source 13 on the semiconductor device 15. If this signal is shifted by a specific amount, a new readout of the line sensor 11 is started. Instead of this the rate at which the line sensor 11 is read may be controlled by the rate of change of the electric signal on the output the synchronizing device 15. As a result of this, the line sensor 11 is always read in synchronism with the movement of the pivotal mirror 2.

In FIG. 1 the path of the beam emitted by the source 13 is represented at some distance from the path of the radiation emitted by the array 6 for the sake of clarity. In practice, the source 13 is arranged near the array 6, so that the beam from the source 13 is incident on the pivotal mirror 2 substantially at the location of the pivotal axis 3 and, consequently, the movement of the pivotal mirror 2 does not give arise to a significant shift of the imaging plane of the system comprising the optics 14 and the pivotal mirror.

Modifications to the apparatus shown in the Figure are readily conceivable. For example, the beam splitter 9 may alternatively be arranged between the array 6 and the optical system 7. Moreover, as regards the construction of the line sensor 11 and the synchronizing device 15 various possibilities exist, which are evident to those skilled in the art.

What is claimed is:

1. An infrared scanning apparatus comprising a plurality of infrared detectors arranged in a line and each supplying an output signal corresponding to infrared radiation incident thereon, means for periodically scanning a scene to be viewed, said scanning means including a scanning element mounted for periodic movement about an axis which is parallel to said line, said scanning element being arranged such that upon movement thereof, consecutive lines of a thermal image of the scene to be viewed are successively projected onto said infrared detectors so that said thermal image is successively scanned line-by-line by said infrared detectors, a plurality of light emitting sources arranged in a single line so as to define a linear array, means for coupling each of said output signals to a respective one of said light emitting sources so that the light emitted by said array is representative of a line of said thermal image scanned by said infrared detectors, a single line sensor positioned for detecting light successively emitted by said linear array of light emitting sources, said successively emitted light being representative of consecutive lines of said image, said line sensor supplying an analog electrical signal corresponding to the light emitted by said linear array and representing a line of said thermal image scanned by said infrared detectors, and a synchronizing means for detecting the movement of said scanning element and generating further signal for synchronizing said analog signal with the movement of said scanning element so as to enable a two dimensional image of the scene to be produced from said electrical analog signal at a remote location.

2. The apparatus according to claim 1 comprising an optical system positioned for imaging said linear array in a plane of observation, said optical system including a beam splitter disposed in the path of the light emitted by said linear array and arranged to direct a first portion of the light to said line sensor and a second portion to said plane of observation.

3. The apparatus according to claim 2 wherein said scanning element is a mirror having a reflective back surface and said beam splitter is arranged to direct said second portion of the light onto said back surface so that the light incident thereon is reflected therefrom to said observation plane.

4. The apparatus according to claims 1, 2 or 3 wherein said line sensor comprises a charge coupled semiconductor device and said further signal controls the read out of said charge coupled device in synchronism with the movement of said scanning element.

5. The apparatus according to claim 1 wherein said synchronizing means comprises a further line sensor and a continuously radiating source arranged to substantially pointwise illuminate said further line sensor via said scanning element.

6. The apparatus according to claim 1 wherein said coupling means includes an amplifier connected between each of said infrared detectors and said respective one of said light emitting sources.

* * * * *